United States Patent [19]

Quigley et al.

[11] Patent Number: 4,790,933
[45] Date of Patent: Dec. 13, 1988

[54] DYNAMIC FILTRATION UNIT AND PROCESS OF USE

[75] Inventors: M. Scott Quigley, Plano; Henry A. Seal, Euless, both of Tex.

[73] Assignee: Mobil Oil Corporation, New York, N.Y.

[21] Appl. No.: 932,053

[22] Filed: Nov. 18, 1986

[51] Int. Cl.⁴ .......................................... B01D 25/06
[52] U.S. Cl. .................................. 210/96.1; 210/103; 210/323.2; 73/153; 73/55; 175/48
[58] Field of Search ............... 210/90, 103, 96.1, 137, 210/323.2, 739, 742, 741; 166/154, 153; 175/66, 217, 218, 48; 73/153, 55

[56] References Cited

U.S. PATENT DOCUMENTS

| | | | |
|---|---|---|---|
| 2,218,533 | 10/1940 | Huebotter | 175/66 |
| 2,241,273 | 5/1941 | Robinson et al. | 175/66 |
| 2,870,990 | 1/1959 | Bergey | 175/66 |
| 3,470,954 | 10/1969 | Hartley | 166/53 |
| 3,477,575 | 11/1969 | Nemec et al. | 210/739 |
| 3,713,499 | 1/1973 | Arscott et al. | 175/66 |
| 3,933,652 | 1/1976 | Weichselbaum et al. | 210/510.1 |
| 3,984,317 | 10/1976 | Donavan | 210/797 |
| 4,192,392 | 3/1980 | Messines et al. | 175/66 |
| 4,410,425 | 10/1983 | Gardes | 210/167 |
| 4,480,702 | 11/1984 | Kelly, Jr. | 175/66 |
| 4,510,800 | 4/1985 | Prior | 73/153 |
| 4,535,851 | 8/1985 | Kirkpatrick et al. | 175/218 |
| 4,599,172 | 7/1986 | Gardes | 175/66 |

FOREIGN PATENT DOCUMENTS

| | | | |
|---|---|---|---|
| 5235446 | 3/1977 | Japan | 210/96.1 |
| 1165430 | 11/1982 | U.S.S.R. | 210/742 |

Primary Examiner—Richard V. Fisher
Assistant Examiner—Coreen Y. Lee
Attorney, Agent, or Firm—Alexander J. McKillop; Michael G. Gilman; Howard M. Flournoy

[57] ABSTRACT

A dynamic filtration unit for drilling and completion fluids employs an adjustable size annulus, high filtration pressures and temperatures, automatic filtration collection and measurement, and natural or artificial filters.

5 Claims, 3 Drawing Sheets

DFCU FLOW SCHEMATIC

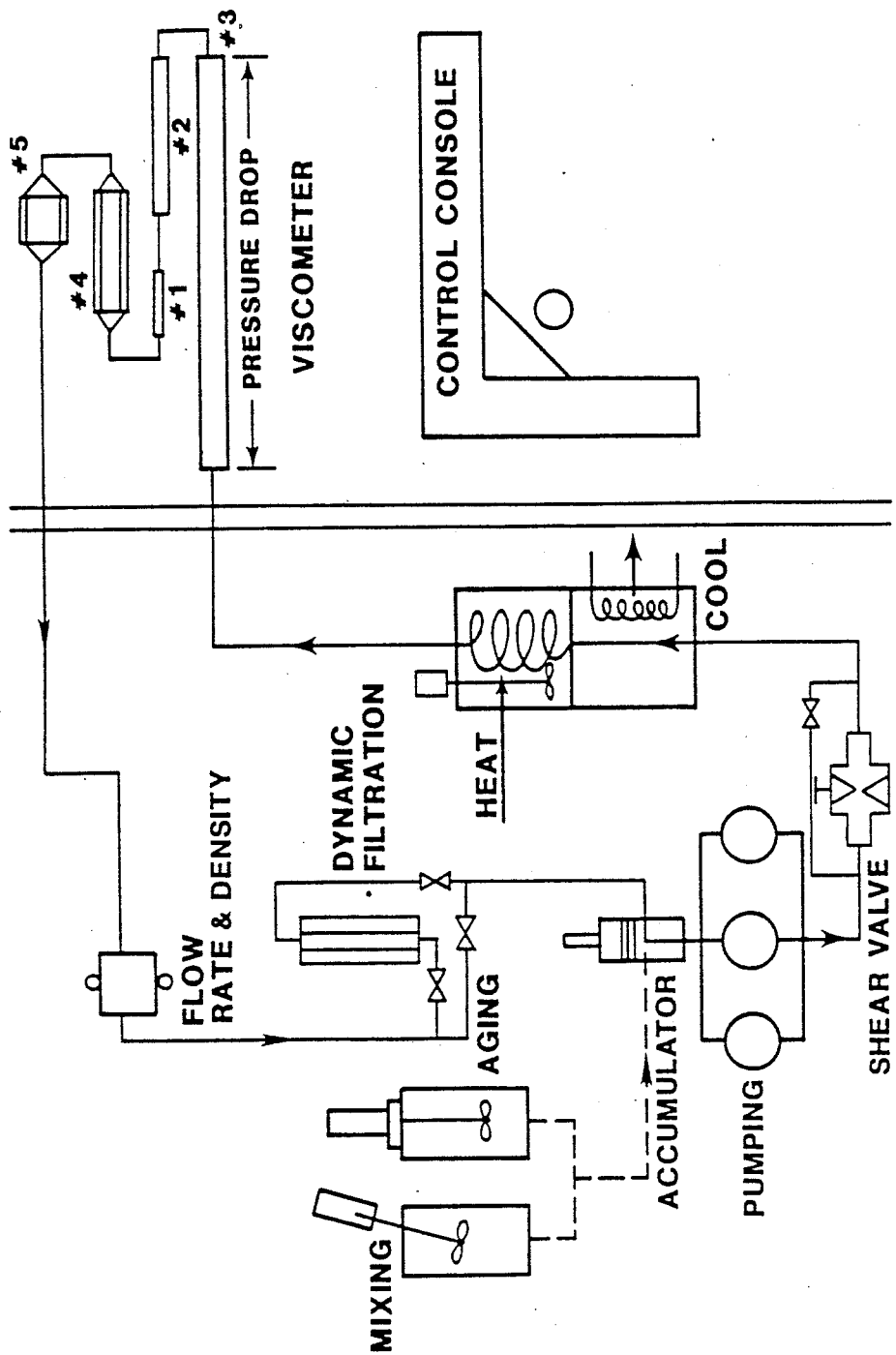

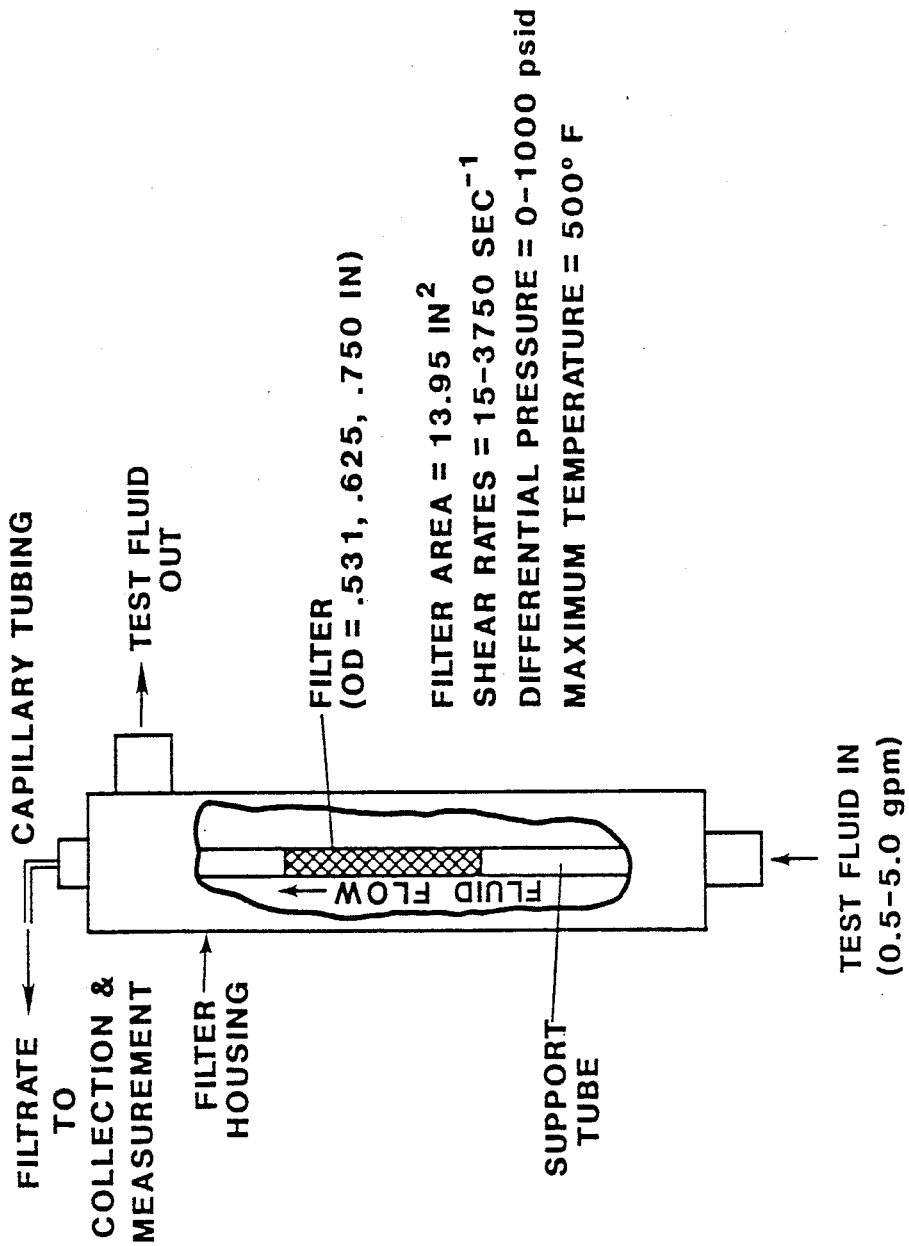

DYNAMIC FILTRATION UNIT AND PROCESS OF USE

BACKGROUND OF THE INVENTION

This invention is directed to a dynamic filtration unit for drilling and completion fluids. Although some dynamic filtration equipment has been developed, the selection of commercially available equipment for measuring dynamic filtration is very limited. Consequently, many researchers have built their own dynamic filtration equipment. None of these, however, are known to provide typical wellbore temperature. Only one is believed to be capable of operating at temperatures above 250° F., and only one known to applicants, can simultaneously measure dynamic filtration and fluid viscosity.

U.S. Pat. No. 3,984,317, for example, discloses apparatus for washing solids in a slurry wherein a dynamic filtering system is provided for separating the solids-containing fluid to form a concentrate and a filtrate. A new and improved dynamic filtration unit and process of using same has now been devised whereby some of these prior art shortcomings have been overcome.

SUMMARY OF THE INVENTION

The present invention is more particularly directed to dynamic filtration apparatus and a process for using same with mixtures of drilling and completion fluids. The apparatus is capable of operating at high filtration pressure, relatively high temperatures and has automatic filtration collection and measurement means utilizing natural or artificial filters.

It is an object of this invention to provide equipment and a process of using same whereby improved means of measuring dynamic filtration is provided; whereby typical wellbore temperature is established; and whereby simultanesous measurement of dynamic filtration and fluid viscosity is possible. Other objects are, of course, within the scope and purview of this invention as those of ordinary skill in the art will readily understand.

BRIEF DESCRIPTION OF THE DRAWINGS

FIG. 2 depicts a drilling fluid circulating unit with the dynamic filtration unit of the present invention.

FIG. 3 shows the dynamic filtration unit in more detail.

DESCRIPTION OF PREFERRED EMBODIMENTS

Generally speaking, the dynamic filtration unit in accordance herewith employs an adjustable size annulus, filtration pressure of 0–1000 psi, temperature up to 500° F., automatic filtration, collection and measurement and natural or artificial filters.

The DRL (Dallas Research Laboratory) Drilling Fluid Circulating Unit (DFCU) is used for preparing, aging, and dynamic evaluation of water-based drilling and completion fluids. FIG. 2 shows the major equipment of the DFCU. Lab fluids or field samples are prepared in the mixing tank and then aged as required. The pump circulates the fluid while the accumulator maintains pump suction pressure above the fluid vapor pressure. Temperature control is provided by successive cooling and heating sections upstream of the viscometer. Fluid density and flowrate are measured by a mass flowmeter ahead of the dynamic filtration unit. The DFCU can operate at temperatues ranging from about ambient to about 500° F. and pressures of atmospheric to about 1500 psi.

Figure 1:
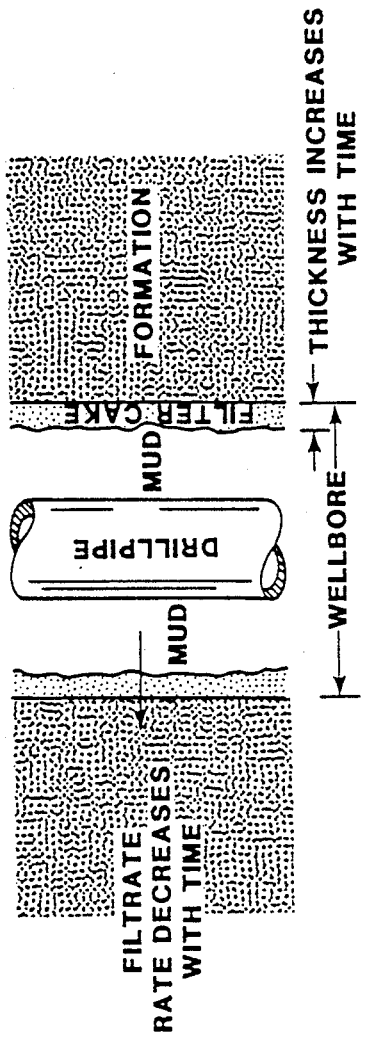
FIG. 1 depicts static and dynamic filtration.
Figure 1:
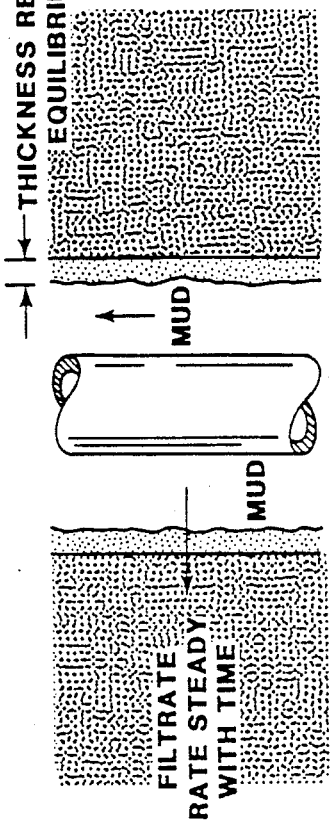

FIG. 1B shows the dynamic filtration process. Filter cake forms when the pressure in the wellbore exceeds the formation pressure. For dynamic filtration, the filter cake thickness increases until the rate of deposition equals the rate of erosion by the flowing mud. During this cake-building time the filtration rate into the formation also increases. The filtration rate stabilizes when the filter cake thickness reaches equilibrium.

The dynamic filtration unit contains three hollow cylindrical filters centralized inside vertical pressure housings as shown in FIG. 3. The nominal ID (inside diameter) of each housing is 1.75 inch, and overall length inside is approximately 26 inches. The OD (outside diameter) of the hollow filters may vary from about 0.500 in. to about 0.750 in. All the hollow filters may simultaneously have the same or three different outside diameters thereby providing adjustable size annulus geometry. The test fluid flows through the annulus created by the inside diameter of the housing and the outside diameter of the filter. The design shown in FIG. 3 accurately provides the full-scale annular shear rate, filtration pressure, and formation permeability.

Porous stainless steel filters with permeabilities ranging from 3.5 to 850 md and preferably from about 5.0 to 740 md and Berea Sandstone filters with 500 md permeability were used. However, suitable filters include any conventional filters known in the art and include both natural and artificial filters. Some suitable filters are limestones and sandstones or any rock with permeability greater than about 0.1 md. Each hollow filter is connected to a vertical collection tube which accurately measures the volume of filtrate passing through the filter. The differential pressure across each filter is individually controlled with nitrogen inside the collection tube.

When the DFCU operating conditions and filtration pressures have stabilized at desired values, a valve in the capillary tubing from each filter is opened to start the test. A data acquisition computer periodically measures the total volume of filtrate in each collection tube. The DFR (dynamic filtration rate) for each filter is calculated from these values.

Referring to FIG. 2, the Drilling Fluid (completion fluid) Circulation Unit includes a mixing vessel in which fluid to be tested is mixed, an aging vessel for aging the fluid mixture as desired. The accumulator pressurizes the fluid (drilling and/or completion fluid) to a constant pressure which is above the vapor pressure of the fluids. The fluid is pumped in a recirculating loop by the pumping means. Pump speed controls the flow of fluid from accumulator, temperature is controlled by successive cooling and heating means. The measurement section comprises the viscometer and the flow rate and density determinators which are upstream of the dynamic filtration unit.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A drilling and completion fluid circulating unit comprising (1) means for mixing such fluids; (2) means for aging the mixture; and a closed circuit connected to said mixing and aging means including (3) accummulator means for maintaining pumping pressure above the vapor pressure of said fluids said accumulator means leading to (4) means for pumping said fluid mixture in a circulating path through said unit having therein (5) temperature control means; and (6) means for measuring the viscosity of said fluids leading to (7) dynamic filtration means with an adjustable annulus means having multiple hollow cylindrical filters located centrally inside multiple vertical pressure housings; and multiple vertical collection tubes attached to said filters; wherein each of said hollow cylindrical filters have a different outside diameter and leading therefrom back to said accumulator/pumping means.

2. The dynamic filtration unit of claim 1 wherein the outside diameter of said hollow cylindrical filters may vary from about 0.250 in. to about 0.750 in. as limited by the internal diameter of said vertical pressure housings.

3. The dynamic filtration unit of claim 1 wherein said filters have permeabilities ranging from about 0.1 to about 850 md.

4. The unit of claim 3 wherein the filters are selected from the group consisting of porous stainless steel filters, and sandstone and limestone filters or mixtures thereof.

5. The fluid circulating unit of claim 1 wherein the temperature control means is provided by successive cooling and heating sections located upstream of said viscosity measuring means.

* * * * *